United States Patent [19]

Jauer et al.

[11] 3,949,043

[45] Apr. 6, 1976

[54] MANUFACTURE OF MONOFILAMENTS

[75] Inventors: Guenter Jauer, Mannheim; Guenter Boenecke, Ludwigshafen; Wolfgang Schaefer, Neustadt; Jacobo Zarate, Hochdorf-Assenheim, all of Germany

[73] Assignee: BASF Farben & Fasern AG, Ludwigshafen (Rhine), Germany

[22] Filed: Aug. 14, 1974

[21] Appl. No.: 497,327

[30] Foreign Application Priority Data

Sept. 7, 1973 Germany............................ 2345125

[52] U.S. Cl............ 264/178 F; 264/210 F; 264/349
[51] Int. Cl.²............................................. D01D 5/08
[58] Field of Search ......... 264/176 F, 178 F, 210 F, 264/349, 344; 260/857 PE, 857 L, 78

[56] References Cited
UNITED STATES PATENTS

| | | | |
|---|---|---|---|
| 3,330,899 | 7/1967 | Fukushima et al. | 264/290 N |
| 3,447,308 | 6/1969 | Foukijn et al. | 264/171 |
| 3,709,971 | 1/1973 | Shimoda et al. | 264/171 |

FOREIGN PATENTS OR APPLICATIONS

| | | | |
|---|---|---|---|
| 44-3505 | 2/1969 | Japan | 264/171 |
| 45-3297 | 2/1970 | Japan | 264/210 F |

Primary Examiner—Jay H. Woo
Attorney, Agent, or Firm—Johnston, Keil, Thompson & Shurtleff

[57] ABSTRACT

An improved process for the manufacture of virtually bubble-free monofilaments of polyhexamethylene adipamide and having a thickness of more than 0.5 mm, wherein polyhexamethylene adipamide containing from 0.05 to 2% by weight of polystyrene finely dispersed therein is passed in the molten state through a sand filter having a particle size between 100 and 1,500 μm and is immediately thereafter melt-spun into a cooling bath, followed by drawing.

7 Claims, No Drawings

MANUFACTURE OF MONOFILAMENTS

This application discloses and claims subject matter described in German Pat. application No. P 23 45 125.4, filed Sept. 7, 1973, which is incorporated herein by reference.

This invention relates to a process for the manufacture of virtually bubble-free monofilaments having a thickness of more than 0.5 mm by melt-spinning polyhexamethyleneadipamide.

The manufacture of bubble-free monofilaments of polyhexamethylene adipamide having thicknesses of less than 0.5 mm generally presents no difficulty in industry, the products being utilized for the manufacture of zip-fasteners and bristles. However, it is desirable to manufacture monofilaments of polyhexamethylene adipamide having thicknesses of more than 0.5 mm without the occurrence of bubbles in the monofilaments, but this is difficult. Attempts have been made to reduce the number of bubbles in the monofilaments by adding lithium halides (U.S. Pat. No. 3,591,656), but this method is expensive.

It is an object of the invention to provide a process for producing substantially bubble-free monofilaments of polyhexamethylene adipamide having a thickness of more than 0.5 mm, in a simple manner.

In accordance with the present invention this and other objects and advantages are achieved in an improved process for the manufacture of virtually bubble-free monofilaments of polyhexamethylene adipamide having a thickness of more than 0.5 mm, the improvement consisting in that polyhexamethylene adipamide containing from 0.05 to 2% by weight of polystyrene finely dispersed therein is passed in the molten state through a sand filter having a particle size between 100 and 1,500 μm and is immediately thereafter melt-spun into a cooling bath, followed by drawing.

The polyhexamethylene adipamide used, also known as nylon 6,6, conveniently has a relative viscosity of from 2.4 to 4.0, as measured on a 1% w/w solution in 96% w/w sulfuric acid at 25°C. It contains finely dispersed polystyrene in amounts of from 0.05 to 2% and in particular from 0.1 to 0.5%, by weight. The polystyrene used is conventional thermoplastic polystyrene conveniently having a molecular weight of from 180,000 to 300,000. It may contain up to 10% by weight of other conventional monomers copolymerized therewith. The polystyrene may be added to the polyhexamethylene adipamide as such or in the form of relatively concentrated polyhexamethylene adipamide master batches. It is convenient to add the polystyrene to the polyhexamethylene adipamide chips.

After melting, the two components are mixed well by usual methods and fed to the spinneret via a sand filter. The sand filter consists of sand exhibiting a particle size between 100 and 1,500 μm and in particular between 500 and 1,400 μm. It is not necessary for the particle size to have one specific value. The size may vary within certain limits, for example over from 200 to 400 μm within the above range. Layer thicknesses of from 3 to 100 mm and in particular from 5 to 80 mm have proved successful. Preferably, where coarse particles are used, thick layers are employed. The spinning pressures are generally from 50 to 400 and in particular from 80 to 180 atmospheres. High pressures are used for fine sand particles and vice versa. The sand filter is disposed immediately upstream of the spinneret holes.

Spinning to monofilaments is carried out under conventional conditions, spinning temperatures of from 260° to 350° and in particular from 270° to 320°C having proved successful. The diameter of the holes is governed by the desired diameter of the drawn monofilaments.

The cooling bath may be any liquid conventionally used, particularly water.

The cooling bath conveniently has a temperature of from 10° to 100°C and in particular from 15° to 50°C. Advantageously, the distance between the spinneret and the cooling bath is not too great, distances of from 10 to 50 cm having proved successful. The monofilaments pass into the cooling bath in a soft state. The velocity at which the monofilaments pass through the cooling bath is generally from 5 to 30 m/min. Residence times of the monofilaments in the cooling bath of from 0.5 to 4 sec. have proved satisfactory.

After the monofilaments have passed through the cooling bath, in which they are sufficiently solidified for passage over conventional threading equipment, they are drawn. Draw ratios of from 1:4 to 1:5.5 and in particular from 1:4.2 to 1:5.0 have proved convenient.

Conventional additives such as antistatic agents, soluble dyes or pigments, e.g., titanium dioxide, light stabilizers and other stabilizers may be incorporated into the monofilaments, conveniently by addition to the molten polyamide.

The monofilaments obtained in the process of the invention are bubble-free over great lengths, this being surprising at the diameters involved. The present process enables monofilaments of consistent quality to be produced over long periods of time.

The monofilaments are very suitable for, say, the manufacture of strong zip-fasteners.

EXAMPLE 1

A polyhexamethylene adipamide having a relative viscosity of 3.2 and containing 0.2% by weight of polystyrene of average molecular weight 250,000 finely dispersed therein is spun in a 45 mm Reifenhauser extruder in which the screw has an l/d ratio of 24. Immediately upstream of the spinneret holes there is disposed a sand filter having a layer thickness of 17 mm and a particle size of from 700 to 900 μm. The holes have a diameter of 4.0 mm. The temperature at the spinnerets is 280°C and the distance of the cooling bath, consisting of water at a temperature of 18°C, from the holes is 200 m. The monofilaments are passed through the cooling bath at a velocity of 27.5 m/min., the length of monofilament in the cooling bath being 300 mm. The monofilaments are then drawn at a ratio of 1:4.5. After drawing, the monofilaments have a diameter of 0.68 mm. These monofilaments are virtually free from bubbles.

EXAMPLE 2

Example 1 is repeated except that a sand filter having a layer thickness of 20 mm and a particle size of from 900 to 1,200 μm is used. Here again, virtually bubble-free monofilaments are obtained.

We claim:

1. An improved process for the manufacture of virtually bubble-free monofilaments of polyhexamethylene adipamide having a thickness of more than 0.5 mm, the improvement consisting in that polyhexamethylene adipamide containing from 0.05 to 2% by weight of polystyrene finely dispersed therein is passed in the molten state through a sand filter having a particle size between 100 and 1,500 μm and immediately thereafter is melt-spun at a temperature of from 260° to 350°C into a cooling bath, followed by drawing at a draw ratio of 1:4 to 1:5.5.

2. A process as set forth in claim 1, wherein a polyhexamethylene adipamide is used which has a relative viscosity of from 2.4 to 4.0 as measured on a 1% solution in 96% w/w sulfuric acid at 25°C.

3. A process as set forth in claim 1, wherein use is made of polyhexamethylene adipamide containing from 0.1 to 0.5% by weight of polystyrene.

4. A process as set forth in claim 1, wherein sand filters having a particle size of from 500 to 1,400 μm are used.

5. A process as set forth in claim 1, wherein the monofilaments are passed through a cooling bath at a velocity of from 5 to 30 m/min.

6. A process as set forth in claim 1, wherein the monofilaments have a residence time in the cooling bath of from 0.5 to 4 seconds.

7. A process as set forth in claim 1 wherein said polyhexamethylene adipamide is melt-spun at a temperature of from 270° to 320°C and wherein said cooling bath is water.

* * * * *